· US009644796B2

(12) United States Patent
Mohammed et al.

(10) Patent No.: US 9,644,796 B2
(45) Date of Patent: May 9, 2017

(54) METHODS FOR IN-SITU CALIBRATION OF A FLOW CONTROLLER

(71) Applicant: APPLIED MATERIALS, INC., Santa Clara, CA (US)

(72) Inventors: Balarabe N. Mohammed, Union City, CA (US); John W. Lane, San Jose, CA (US); Mariusch J. Gregor, Gilroy, CA (US); Dan Joseph Healy, Morgan Hill, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1139 days.

(21) Appl. No.: 13/627,547

(22) Filed: Sep. 26, 2012

(65) Prior Publication Data

US 2013/0081702 A1    Apr. 4, 2013

Related U.S. Application Data

(60) Provisional application No. 61/540,817, filed on Sep. 29, 2011.

(51) Int. Cl.
*G01F 1/12* (2006.01)
*F17D 3/00* (2006.01)
(Continued)

(52) U.S. Cl.
CPC ............ *F17D 3/00* (2013.01); *G01F 25/003* (2013.01); *G05D 7/0635* (2013.01); *Y10T 137/0324* (2015.04); *Y10T 137/86485* (2015.04)

(58) Field of Classification Search
CPC .................................................. A01K 29/005
(Continued)

(56) References Cited

U.S. PATENT DOCUMENTS 5,944,048 A    8/1999   Bump et al.
6,973,375 B2  12/2005   Brodeur et al.
(Continued)

FOREIGN PATENT DOCUMENTS

CN      1848015 A    10/2006
CN    101436069 A     5/2009
(Continued)

OTHER PUBLICATIONS

International Search Report and Written Opinion mailed Mar. 26, 2013 for PCT Application No. PCT/US2012/057830.
(Continued)

*Primary Examiner* — Aditya Bhat
(74) *Attorney, Agent, or Firm* — Moser Taboada; Alan Taboada

(57) ABSTRACT

Methods and apparatus for in-situ calibration of a flow controller are provided herein. In some embodiments, a method of flowing a gas includes providing a flow controller configured to provide a first gas at a first value of a flow rate based on a calculated first relationship determined by using a standard gas; determining an actual first relationship between the flow rate and the setpoint for the first gas from a plurality of values of the flow rate of the first gas determined at a corresponding plurality of values of the setpoint of the flow controller, wherein each of the plurality of values of the flow rate is determined from flowing the first gas through the flow controller at corresponding ones of the plurality of values for the setpoint; and flowing the first gas at the first value of the flow rate based on the actual first relationship.

20 Claims, 2 Drawing Sheets

(51) Int. Cl.
*G01F 25/00* (2006.01)
*G05D 7/06* (2006.01)

(58) Field of Classification Search
USPC .................................................. 702/41
See application file for complete search history.

(56) References Cited

U.S. PATENT DOCUMENTS

| | | | |
|---|---|---|---|
| 2001/0004903 A1 | 6/2001 | Ohmi et al. | |
| 2002/0083984 A1 | 7/2002 | Easton | |
| 2004/0030522 A1* | 2/2004 | Tison | G01F 1/684 702/100 |
| 2004/0074311 A1* | 4/2004 | Lull | G01F 1/696 73/861 |
| 2008/0035202 A1 | 2/2008 | Lee et al. | |
| 2009/0146089 A1 | 6/2009 | Moriya et al. | |
| 2010/0000608 A1 | 1/2010 | Goto et al. | |
| 2010/0071438 A1 | 3/2010 | Davis et al. | |
| 2010/0229965 A1 | 9/2010 | Kashima et al. | |

FOREIGN PATENT DOCUMENTS

| | | |
|---|---|---|
| JP | 05-059502 U | 8/1993 |
| JP | 06-275562 | 9/1994 |
| JP | 08-335118 A | 12/1996 |
| JP | 2004-319857 A | 11/2004 |
| JP | 2006-30851 A | 12/2006 |
| KR | 10-0969990 B1 | 7/2010 |

OTHER PUBLICATIONS

International Search Report and Written Opinion mailed Mar. 29, 2013 for PCT Application No. PCT/US2012/057829.

Search Report from The State Intellectual Property Office of the People's Republic of China for Chinese Application No. 2012800558727 dated Nov. 17, 2015.

\* cited by examiner

METHODS FOR IN-SITU CALIBRATION OF A FLOW CONTROLLER

CROSS-REFERENCE TO RELATED APPLICATIONS

This application claims benefit of U.S. provisional patent application Ser. No. 61/540,817, filed Sep. 29, 2011, which is herein incorporated by reference.

FIELD

Embodiments of the present invention generally relate to methods and apparatus for substrate processing, and specifically to methods and apparatus for in-situ calibration of flow controllers.

BACKGROUND

A flow controller can be used to deliver a process gas to a processing volume of a process chamber. The flow controller is typically calibrated prior to installation on the process chamber using a standard gas by the manufacturer. The inventors provide improved methods for in-situ calibration of a flow controller.

SUMMARY

Methods and apparatus for in-situ calibration of a flow controller are provided herein. In some embodiments, a method of in-situ calibration of a flow controller coupled to a process chamber may include providing a flow controller that is configured to provide a first gas at a first value of a flow rate when set to a first value of a setpoint based on a calculated first relationship determined by using a standard gas that is different from the first gas; determining an actual first relationship between the flow rate and the setpoint for the first gas from a plurality of values of the flow rate of the first gas determined at a corresponding plurality of values of the setpoint of the flow controller, wherein each of the plurality of values of the flow rate is determined from flowing the first gas through the flow controller at corresponding ones of the plurality of values for the setpoint; and flowing the first gas at the first value of the flow rate from the flow controller based on the actual first relationship.

In some embodiments, an apparatus for processing a substrate may include a process chamber having a processing volume; and a first flow controller coupled to the process chamber to provide a first gas to the processing volume, wherein the first flow controller is configured to provide the first gas at a first value of a flow rate when set to a first value of a setpoint based on a calculated first relationship determined by using a standard gas that is different from the first gas; and a controller coupled to the process chamber, wherein the controller further comprises a computer readable medium having instructions stored thereon that, when executed by the controller, cause a first method for flowing a gas into the processing volume to be performed, the method including determining an actual first relationship between the flow rate and the setpoint for the first gas from a plurality of values of the flow rate of the first gas determined at a corresponding plurality of values of the setpoint of the first flow controller, wherein each of the plurality of values of the flow rate is determined from flowing the first gas through the first flow controller at corresponding ones of the plurality of values for the setpoint; and flowing the first gas at the first value of the flow rate from the first flow controller based on the actual first relationship.

In some embodiments, a method of monitoring a flow controller coupled to a process chamber may include monitoring a first zero offset of a flow controller at a first time; monitoring a second zero offset of the flow controller at a second time after the first time; and issuing a service warning if a cumulative zero drift exceeds about 10 percent of the full flow range of the flow controller, wherein the cumulative zero drift is the summation of the first zero offset and the second zero offset.

In some embodiments, a method of monitoring a flow controller coupled to a process chamber may include monitoring a first time during which the flow controller is in operation; monitoring a second time during which the flow controller is in operation; and issuing a service warning if a cumulative operating lifetime exceeds a first critical value, wherein the cumulative operating lifetime is the summation of the first time and the second time.

In some embodiments, a method of monitoring a flow controller coupled to a process chamber may include sampling a temperature value of the flow controller at a first interval over the first period; and issuing a service warning if a standard deviation calculated from the sampled temperature values exceeds a set temperature value of the flow controller by a critical value.

In some embodiments, a method of monitoring a flow controller coupled to a process chamber may include sampling a value of an output signal from a position controller to an adjustable valve of the flow controller at a first sample rate; and issuing a service warning if a stand deviation calculated from the sampled output signal values exceeds a steady state setpoint of the output signal by a critical value.

In some embodiments, a method of monitoring a flow controller coupled to a process chamber may include monitoring a first value of at least one of a first parameter of the flow controller or a second parameter of the process chamber at a first flow rate of the flow controller at a first time; monitoring a second value of the at least one of the first parameter of the flow controller or the second parameter of the process chamber at the first flow rate of the flow controller at a second time after the first time; and determining the status of at least one of the flow controller or a component of the process chamber from a comparison of the first and second values.

In some embodiments, a method of monitoring a flow controller coupled to a process chamber may include monitoring a plurality of values of at least one of a first parameter of the flow controller or a second parameter of the process chamber at a first flow rate of the flow controller over a corresponding plurality of times; determining the status of at least one of the flow controller or a component of the process chamber from a comparison of two or more of the plurality of values; and setting the at least one of the first parameter of the flow controller or the second parameter of the process chamber to a new value based on the comparison.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
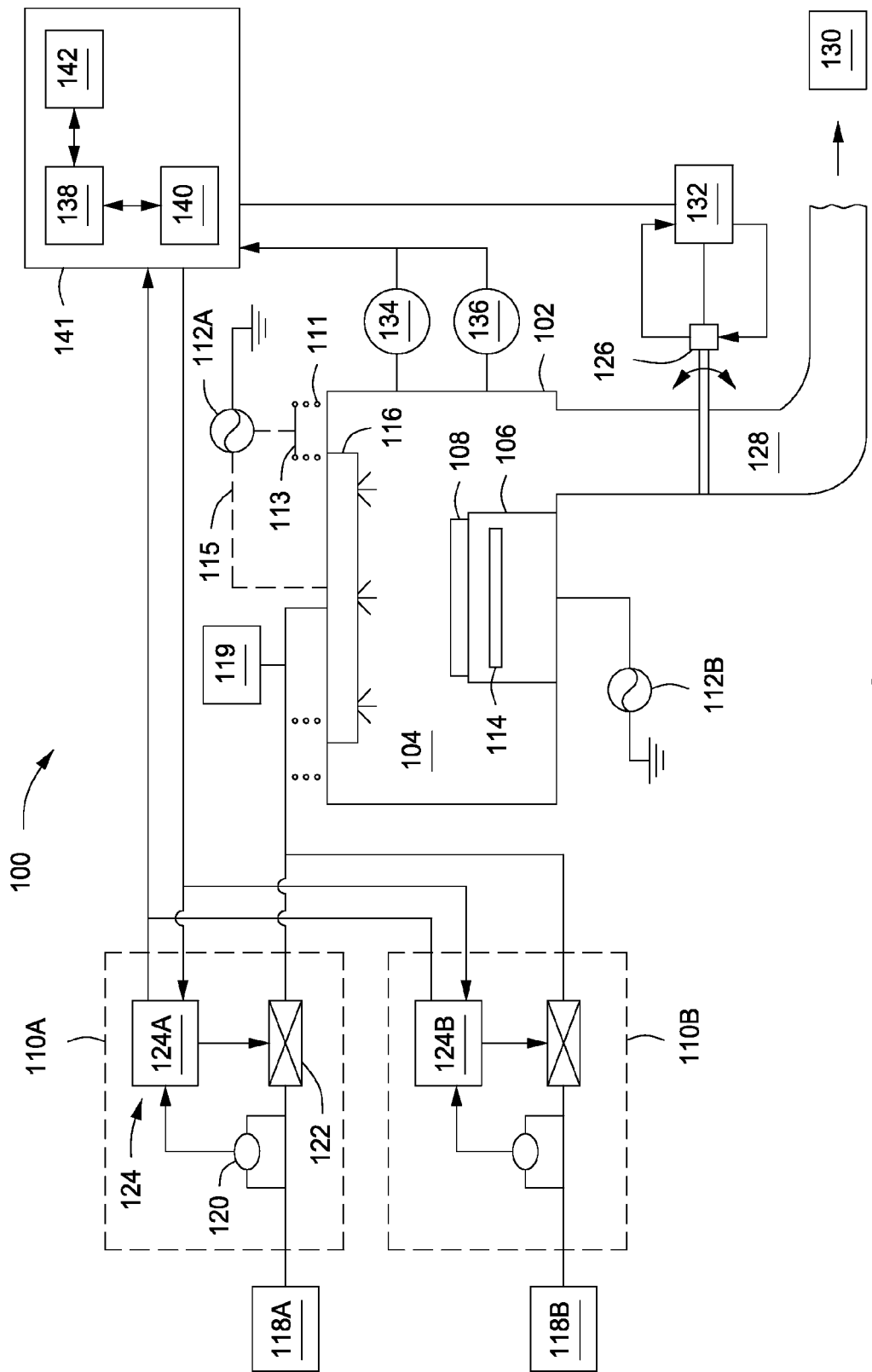
FIG. 1 depicts a substrate processing system in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Methods and apparatus for substrate processing are disclosed herein. The inventive methods and apparatus may advantageously provide a wider flow rate range for a flow controller while maintaining flow rate accuracy, on tool calibration of each flow controller, remote update capability to calibration algorithms, and health monitoring of flow controllers. The inventive methods and apparatus may further advantageously limit downtime of the tool, for example, by using remote updates, and reduce costs due to equipment error by using health monitoring of the flow controllers. Other and further advantages of the inventive methods and apparatus are discussed below.

FIG. 1 depicts a substrate processing system 100 in accordance with some embodiments of the present invention. The substrate processing system 100 may include a process chamber 102 having a processing volume 104. A substrate support 106 may be disposed in the processing volume 104 to support a substrate 108 during processing in the substrate processing system 100. The process chamber 102 may be any suitable process chamber for processing a substrate and/or multiple substrates simultaneously. For example, the process chamber 102 may be configured for one or more of chemical vapor deposition (CVD), atomic layer deposition (ALD), physical vapor deposition (PVD), metal chemical vapor deposition (MCVD), blanket deep sub-micron chemical vapor deposition (blanket DSM-CVD) or any suitable plasma or non-plasma enabled or enhanced processes, such as etching, deposition, cleaning, or the like. The substrate support 106 may be any suitable substrate support for use with any suitable configurations of the process chamber 102. The substrate support 106 may include one or more of a susceptor, a vacuum chuck, an electrostatic chuck, or the like, and may include components 114, such as one or more of a heater, an RF electrode, lift pin assemblies, or the like.

The system 100 may include one or more processing sources to provide one or more process parameters to the processing volume 104. For example, process parameters may include a magnitude of RF power, a flow rate of a process gas, a temperature of a chamber component, chamber pressure, foreline pressure, susceptor backside pressure, process gas type, process gas temperature, susceptor temperature, susceptor position, substrate heater power level, exhaust valve heater power level or the like. For example, the one or more process parameters may be provided by processing sources, such as one or more flow devices, one or more radio frequency (RF) power sources, a substrate heater, exhaust valve heater or the like.

For example, one or more flow devices 110 may be coupled to a gas inlet 116 to provide one or more process gases to the processing volume 104. The gas inlet 116 may be any suitable inlet or inlets for providing the one or more process gases to the processing volume 104 in a desired manner (such as into a region of the processing volume 104 above the substrate 108, directed towards the substrate 108, directed across the surface of the substrate 108, or the like). For example, the gas inlet 116 may be one or more of a showerhead (as shown), a gas injector, nozzles, or the like. Although illustrated in FIG. 1 as being disposed above the substrate support 106, the gas inlet 116 may be disposed, alternately or in combination, in sidewalls or bottom of the process chamber 102, or within the process chamber (for example, adjacent to the substrate support 106). Each of the one or more flow devices 110 may be coupled to one or more of a plurality of gas sources 118. For example, the plurality of gas sources 118 may be part of a gas panel or the like, wherein each flow device 110 controls the flow of a process gas from a corresponding gas source 118 to the gas inlet 116.

One or more RF power sources may be used to provide RF power to various portions of the processing system 100, such as the processing volume 104 to form a plasma from the process gas or some other gas or gases flowed into the processing volume 104, or to the substrate support 106, or the like. For example, a first RF power source 112A and a second RF power source 112B are depicted in FIG. 1. The first and second RF power sources 112A, 112B are collectively referred to herein as the one or more RF power sources 112, or the RF power source 112. Each RF power source generally includes an RF generator and a matching circuit used to match the impedance of the RF generator and the plasma. The one or more RF power sources may be coupled to various elements in the substrate processing system 100.

The first RF power source 112A may be utilized to facilitate forming a plasma from the one or more process gases. In some embodiments, the first RF power source 112A may be disposed proximate a lid or ceiling of the process chamber 102. For example, the first RF power source 112A may be configured to couple RF energy to the one or more process gases within the process chamber 102 to form a plasma. In some embodiments, the first RF power source 112A may be coupled to an electrode such as one or more inductive coils 111 disposed above the ceiling of the process chamber 102, for example as shown by dashed line 113. Alternatively or in combination, the first RF power source 112A may be coupled to an electrode disposed in or near the ceiling of the process chamber, such as a conductive portion of the gas inlet 116, as shown by dashed line 115. The first RF power source 112A may also or alternatively be coupled to other suitable components to provide RF energy in a desired location. Although a single RF source (e.g., 112A) is shown coupled to the process chamber 102 proximate the ceiling, multiple RF power sources may be coupled to the ceiling at the same electrode or to different electrodes.

The second RF power sources 112B may be coupled to the substrate support 106, for example, to provide substrate bias control during processing. Similar as described above, although a single RF source is shown coupled to the substrate support 106, multiple RF power sources may be coupled to the substrate support 106 at the same electrode or to different electrodes. In addition, or in the alternative, other RF power sources 112 may be coupled to other components of the process chamber such as electrodes (not shown) disposed in or near sidewalls of the process chamber or in other desired locations to couple RF energy to the process chamber or gases disposed in or flowing into the process chamber 102.

Each of the one or more flow devices 110 may be a mass flow device, such as a mass flow controller or the like. For example, as illustrated in FIG. 1, the one or more flow devices 110 may include a first flow controller 110A and a second flow controller 110B. The first flow controller 110A may be coupled to the process chamber 102 to provide a first gas to the processing volume 104 from a first gas source 118A. The second flow controller 110B may be coupled to the process chamber 102 to provide a second gas to the processing volume 104 from a second gas source 118B.

Each of the one or more flow devices 110 may include a sensor 120 and an adjustable valve 122 in communication with a position controller 124 to provide local closed loop control between the sensor, the adjustable valve and the position controller. The position controller 124 may send and receive instructions from a system controller 141 as illustrated in FIG. 1. For example, the first flow controller 110A includes a first position controller 124A coupled to the sensor 120 and the adjustable valve 122 of the first flow controller 110A. For example, the second flow controller 110B includes a second position controller 124B coupled to the sensor 120 and the adjustable valve 122 of the second flow controller 110B. The sensor 120 may include one or more of a pressure sensor or a temperature sensor. Each position controller 124A, 124B may be a controller for controlling each of the components of the respective first and second flow controllers 110A, 110B. For example, in operation, the sensor 120 may provide the controller 124A with a signal indicative of one or more of pressure or temperature of the first gas to determine a flow rate of the first gas and the controller 124A may adjust the adjustable valve 122 to maintain a desired flow rate. For example, each position controller 124A, 124B may include a computer processing unit (CPU), memory, support circuits and the like for storing and/or executing methods and/or receiving remote updates from the system controller 141 or another source.

The one or more flow devices 110 illustrated in FIG. 1 are merely exemplary, and other embodiments are possible, such as the sensor 120 and the adjustable valve 122 in direct communication with a system controller, such as system controller 141, in the absence of an onboard position controller, such as the position controller 124 (not shown).

The system 100 may further include a exhaust valve 126 disposed between the processing volume 104 and an exhaust volume 128 of an exhaust system 130. The exhaust valve 126 may be any suitable valve used in substrate processing systems, such as a gate valve, a throttle valve, a butterfly valve, pendulum valve, or the like. The exhaust valve 126 is coupled to a motorized drive 132 control a position of the exhaust valve 126. For example, a position change of the exhaust valve 126 may result in a greater or lesser exposure to a lower pressure region, such as in the exhaust volume 128 or the like. The lower pressure region may be generated by any suitable vacuum pump or similar pumping device (not shown) coupled to the exhaust region 128 or the exhaust system 130.

The pressure in the processing volume 104 may be monitored by one or more pressure gauges. For example, a first pressure gauge 134 may be used to measure a first range of pressure in the processing volume 104. In some embodiments, the first range of pressure may be about 1 to about 10 Torr. A second pressure gauge 136 may be used to measure a second range of pressure in the processing volume. The second range of pressure may be different from the first range of pressure, for example, one of the first or second pressure gauges may be a high pressure gauge and the other may be a lower pressure gauge. In some embodiments, the second range of pressure may be about 10 to about 500 Torr. The first and second pressure gauges 134, 136 may be any suitable pressure gauges for measuring the desired pressure ranges, for example, such as ion gauges, thermocouple gauges, capacitance gauges, strain gauges, Pirani gauges or the like. Additional pressure gauges may also be provided, if desired, for monitoring different pressure ranges. Providing multiple pressure gauges tuned for particular pressure ranges may advantageously facilitate more precise control of the processing system as compared to using a single pressure gauge over a wide range of pressures. For example, pressure gauges may be provided to monitor the exhaust volume 128, a backside of a susceptor, or the like.

The first and second pressure gauges 134, 136 may be directly coupled to the controller 141 as illustrated in FIG. 1. Similarly, the motorized drive 132 may be directly coupled to and controlled by the controller 141. The configuration of the pressure gauges 134, 136 and the motorized drive 132 as illustrated in FIG. 1 is one exemplary embodiment, wherein the system controller 141 can act as, and or include a pressure controller (not shown) to control the motorized drive 132 to change the position of the exhaust valve in response to the pressure in the processing volume 104 as monitored through the pressure gauges 134, 136. Alternatively, a separate pressure controller (not shown) may be used, where the pressure gauges 134, 136 may be coupled to the separate pressure controller instead of the controller 141 and wherein the separate pressure controller controls the motorized drive 132.

The controller 141 comprises a central processing unit (CPU) 138, a memory 140, and support circuits 142 for the CPU 138 and facilitates control of the components of the system 100 and, as such, of methods of controlling the system, such as method 200 discussed below. The controller 141 may be one of any form of general-purpose computer processor that can be used in an industrial setting for controlling various chambers and sub-processors. The memory, or computer-readable medium, 140 of the CPU 138 may be one or more of readily available memory such as random access memory (RAM), read only memory (ROM), floppy disk, hard disk, or any other form of digital storage, local or remote. The support circuits 142 are coupled to the CPU 138 for supporting the processor in a conventional manner. These circuits include cache, power supplies, clock circuits, input/output circuitry and subsystems, and the like. The controller 141 may include circuitry and/or subsystems for directly controlling flow devices, motorized drives, RF power sources, substrate heaters, exhaust valve heaters, monitoring pressure gauges, and any suitable circuitry and/or subsystems to directly control various components of a substrate processing system. The memory 140 stores software (source or object code) that may be executed or invoked to control the operation of the system 100 in accordance with the embodiments of the invention as described herein. Further, the controller 141 may be remote from the system 100 and/or receive instructions remotely from a facilities controller or the like. For example, the controller 141 and/or facilities controller may communicate remotely to the controller 141 and/or various components of the system 100 via a remote communication system, such as EtherCAT (Ethernet for Control Automation Technology) or the like.

Figure 2:
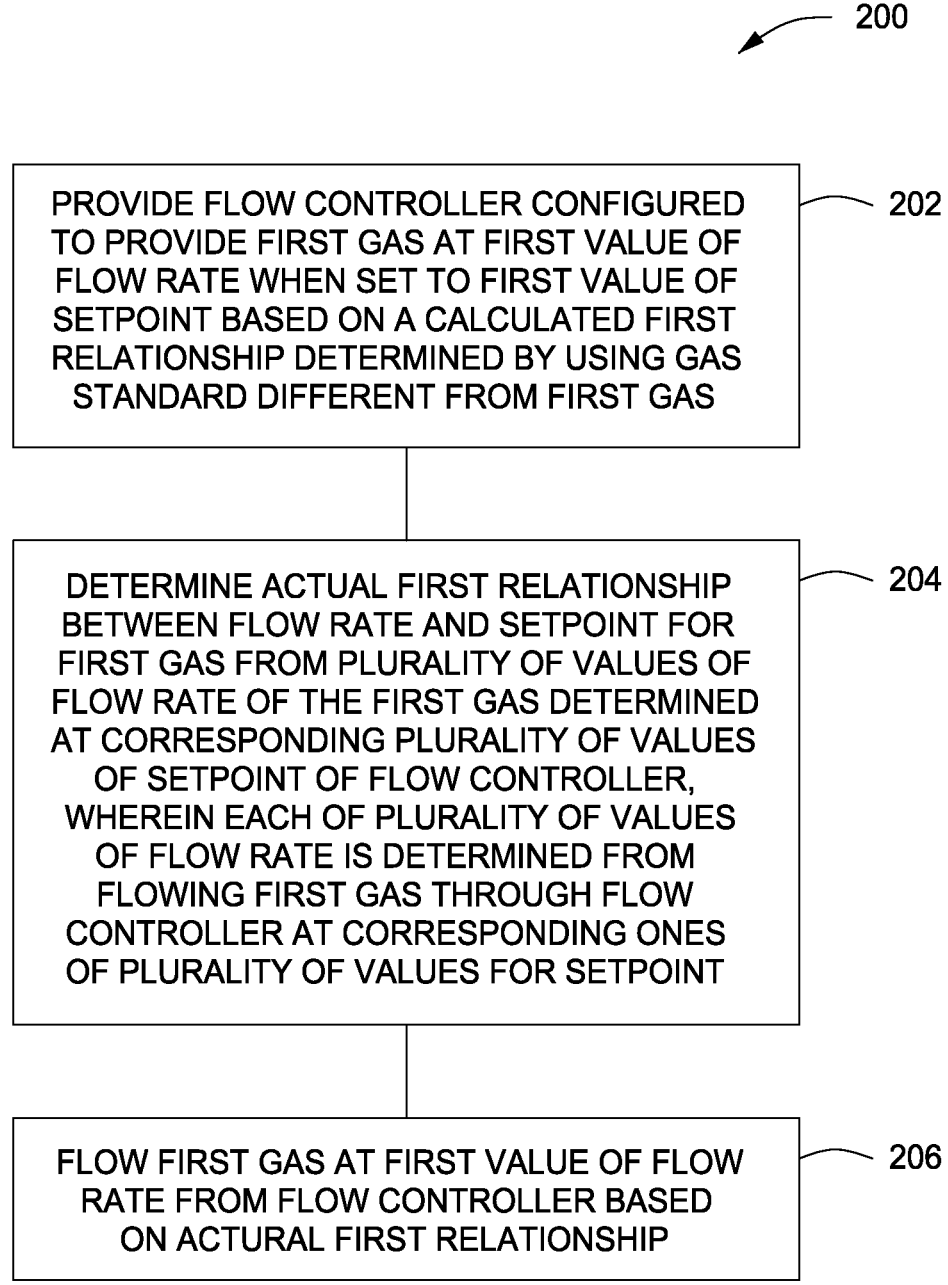
FIG. 2 depicts a flow chart of a method for in-situ calibration of a flow controller coupled to a process chamber.

FIG. 2 depicts a flow chart of a method 200 for in-situ calibration of a flow controller coupled to a process chamber. The method 200 (e.g., a first method) may be described below in accordance with embodiments of the substrate processing system 100 discussed above. For example, instructions for executing the method 200 may be stored on the system controller 141, such as on a computer readable medium as part of the memory 140, or on any controller that can be used to control the substrate processing system 100, either locally or remotely. The method 200 may begin at 202 by providing a flow controller, such as the first flow controller 110A, which may be configured to provide the first gas at a first value of a flow rate when set to a first value of a setpoint based on a calculated first relationship determined by using a standard gas different from the first gas. As used herein the phrase "configured to" may mean "intended to" as explained herein. For example, the first flow controller 110A may be intended to provided the first gas at the first value of the flow rate when set to the first value of the setpoint based on the calculated first relationship. However, the first flow controller 110A may not necessarily provide the first gas at the first value of the flow rate when set to the first value of the setpoint based on the calculated first relationship.

For example, the calculated first relationship may be determined by the manufacturer of the first flow controller 110A during the manufacture of the first flow controller 110A. Accordingly, instructions for executing the calculated first relationship may be stored on the first flow controller 110A, such as on a computer readable medium that is part of the position controller 124A or the like. When the instructions (e.g., a second method) are executed by the position controller 124A, the first flow controller 124A may apply the calculated first relationship to an input value of the setpoint to flow the first gas at a corresponding output value of the flow rate.

For example, determining the calculated first relationship may include determining an actual second relationship between a flow rate and a setpoint for the standard gas from a plurality of values for the flow rate of the standard gas and a corresponding plurality of values of the setpoint of the first flow controller. For example, the actual second relationship may be determined by using a calibration device, such as a mass flow verifier or the like. For example, a rate of pressure rise may be measured for the standard gas at each corresponding value of the plurality of values of the setpoint, and then each value of the plurality of values of the flow rate of the standard gas may be determined from the rate of pressure rise at each corresponding value of the plurality of values of the setpoint. For example, the standard gas may be nitrogen ($N_2$). Typically, the manufacturer may measure the rate of pressure rise for several setpoints, about 3 setpoints or more, and determine a flow rate at each setpoint from the rate of pressure rise at each corresponding setpoint. The plurality of determined flow rates of the standard gas at the corresponding plurality of setpoints may be fit to a line to determine the actual second relationship for the standard gas. A gas correction factor (e.g., a first gas correction factor) may then be used to adjust the actual second relationship for use with the first gas to form the calculated first relationship. For example, the gas correction factor may be a scaling factor which changes an intercept of the fitted line when the correction factor is applied. For example, the gas correction factor may be computed from physical constants of the first gas, such as density, specific heat, or the like.

Unfortunately, the inventors have discovered that the calculated first relationship may not provide (although configured to do so) the first value of the flow rate for the first gas at the first value of the setpoint of the first flow controller. For example, the inventors have identified that shortcomings to the calculated first relationship may include that the actual second relationship for the standard gas may not approximate a line over the full setpoint range of the first flow controller and further that an actual second relationship for the standard gas may not have the same shape as the same relationship determined for the first gas over the full setpoint range of the first flow controller. Accordingly, the calculated first relationship may not be accurately providing the flow rate of the first gas over the full range of setpoints for the first flow controller. In some embodiments, the accuracy may be improved by using multiple flow controllers, each configured to provide only a portion of the full range of setpoints. For example, one flow controller may be used to provide a low flow rate over the lower portion of the setpoint range and another flow controller may be used to provide a high flow rate over the higher portion of the setpoint range. However, using multiple flow controllers can be cost and space prohibitive. Accordingly, the inventors have devised the in-situ method 200 to calibrate the first flow controller 110A, such that it provides the first gas at the desired flow rate over the full range of setpoints of the first flow controller 110A.

At 204, an actual first relationship is determined between the flow rate and the setpoint for the first gas from a plurality of values of the flow rate determined at a corresponding plurality of values of the setpoint of the first flow controller 110A. For example, each value of the plurality of values of the flow rate may be determined by flowing the first gas through the flow controller at corresponding ones of the plurality of values of the setpoint. For example, the first gas may be provided by the first gas source 118A and may be flowed through the first flow controller 110A and then diverted to a calibration device 119 for determination of each flow rate instead of to the gas inlet 116. The calibration device 119 may be coupled to the system 100 between the first flow controller 110A and the processing volume 104 as illustrated in FIG. 1. The calibration device 119 may be any suitable calibration device, such as a mass flow verifier, mass flow meter, a Molbloc™ flow element, or the like. Further, the calibration device 119 may utilize any suitable calibration methods, such as in-situ rate of decay or the like.

For example, in some embodiments, determining the plurality of values for the flow rate of the first gas using the calibration device 119 includes measuring a rate of pressure rise for the first gas at each corresponding value of the plurality of values of the setpoint of the first flow controller 110A and determining each value of the plurality of values of the flow rate for the first gas from the rate of pressure rise at each corresponding value of the plurality of values of the setpoint. For example, the rate of pressure rise may be measured at many setpoints, for example 10 or more setpoints, or any suitable number of setpoints necessary to determine the behavior of the flow rate for the first gas over the full range of setpoints for the first flow controller 110A.

For example, once the plurality of values of the flow rate for the first gas have been determined for each corresponding value of the setpoint as discussed above, then the plurality of determined flow rate for the first gas at the corresponding plurality of setpoints may be fit to a curve to determine the actual first relationship for the first gas. For example, the curve can be any suitable shape as determined from the behavior of the plurality of values of the flow rate for the first gas over the corresponding plurality of values for the setpoint. For example, the curve may be polynomial, binomial, cubic hermite or the like. The actual first relationship may accurately determine the flow rate of the first gas over the full range of setpoints for the first flow controller 110A. The actual first relationship may advantageously provide a wider range of accurate flow rates for the first gas from the first flow controller 110A due to determination of the flow rate over the full range of setpoints of the first flow controller 110A and use of non-linear curve fitting to approximate the behavior of the flow rate for the first gas over the full range of setpoints.

At 206, the first gas may be flowed at the first value of the flow rate from the first flow controller 110A based on the actual first relationship. For example, after the actual first relationship is determined at 204, the flow of the first gas, which had been diverted to the calibration device 119, may be directed to the processing volume 104. For example, the actual first relationship may be applied to the first mass flow controller 110A by any number of suitable data transfer schemes. For example, in some embodiments, the actual first relationship may reside on the system controller 141 and when executed, feed an input value of the setpoint to the first flow controller 110A such that the first value of the flow rate is flowed from the first flow controller 110A. For example, a second value of the setpoint different from the first value of the setpoint that produces the first value of the flow rate for the first gas may be determined from the actual first relationship. Then, the second value of the setpoint may be applied to the calculated first relationship as the input value to provide an output value equal to the first value of the flow rate for the first gas from the first flow controller 110A. Accordingly, in the aforementioned exemplary method, the system controller 141 may use the actual first relationship to provide the second value of the setpoint as an input to the calculated first relationship to produce the desired first value of the flow rate from the first flow controller 110A.

Alternatively, the calculated first relationship, which may reside on the first flow controller 110A, may be updated and/or replaced by the actual first relationship, which can reside on the system controller 141. For example, the system controller 141, after determining the actual first relationship at 204, may feed back information to the first flow controller 110A that causes the first flow controller 110A to re-write the calculated first relationship into the actual first relationship. Alternatively, the system controller 141 may feed back information to the first flow controller 110A to replace the calculated first relationship with the actual first relationship. For example, the update and/or replacement of the calculated first relationship may be performed as part of a service routine, for example, such as a service routine that would generate a new firmware on the first flow controller 110A.

For example, once the update and/or replacement of the calculated relationship with the actual first relationship is complete, the first flow controller 110A may be set to the first value of the setpoint based on the actual first relationship to flow the first gas at the first value of the flow rate from the first flow controller 110A.

Alternatively, the calculated first relationship may reside and/or be downloaded to the system controller 141 and modified accordingly. For example, the calculated first relationship may initially reside on the first flow controller 110A. During the method 200, the calculated first relationship may be downloaded into the system controller 141 and modified by the system controller 141 to form the actual first relationship. Then, the actual first relationship may be uploaded to the first flow controller 110A to update and/or replace the calculated first relationship. This alternative method of downloading the calculated first relationship to the system controller 141 may differ from the alternative method discussed above where the calculated first relationship is updated by the first flow controller 110A based on information received from the system controller 141. For example, in the present alternative method, the system controller 141 modifies the calculated first relationship directly. By comparison, in the aforementioned alternative method, the system controller 141 provides information to the first flow controller 110A and the first flow controller 110A modifies the calculated first relationship based on the information provided by the system controller 141.

The method 200 may be utilized, for example, with the second flow controller 110B or with any desired number of flow controllers. For example, the second flow controller 110B may be configured to provide the second gas at a second value of a flow rate when set to a second value of a setpoint based on a calculated second relationship determined by using a standard gas different from the second gas. The calculated second relationship may be determined by the manufacturer of the second flow controller 110B in a similar manner to the calculated first relationship, except using a second gas correction factor for use with the second gas to adjust the actual standard relationship. The calculated second relationship may reside on the second flow controller 110B, such as on a computer readable medium or the like.

For example, the method for calibrating the second flow controller 110B may include determining an actual second relationship between the flow rate and the setpoint for the second gas from a plurality of values of the flow rate of the second gas determined at a corresponding plurality of values of the setpoint of the second flow controller, wherein each of the plurality of values of the flow rate is determined from flowing the second gas through the second flow controller at corresponding ones of the plurality of values for the setpoint; and flowing the second gas at the second value of the flow rate from the second flow controller based on the actual second relationship.

The actual second relationship may be determined in a similar manner to the actual first relationship as discussed above. The curve used to fit the actual second relationship may differ from that used to fit the actual first relationship and may be dependent on the behavior of the second gas.

The inventive methods may further include methods for monitoring the health of a flow controller. For example, health monitoring of the flow controller may be desirable to avoid faulty product batches produced by the tool using faulty and/or poorly calibrated flow controllers. For example, the monitoring methods discussed below may reside on the system controller 141 and be uploaded and/or integrated into the position controller of the flow controller, such as during a service routine that provides information to the flow controller and/or during a service routine that downloads information from the flow controller to the system controller, updates the information, and reloads the updated information to the flow controller.

For example, one such health monitoring method may be monitoring a cumulative zero drift in the flow controller. For example, the method may include monitoring the zero offset of the flow controller, such as periodically, during servicing, or at any desired interval. A record may be made of cumulative zero drift of the flow controller, for example, from an initial calibration and/or installation date. For example, at an initial time, the zero offset may be about 1% of the full flow range. When measured at a second time after the initial time, the zero offset may be about 1% more than at the initial time, for a cumulative zero drift of about 2% of the full flow range. For example, when measured at a third time after the second time, the zero offset may be about 1% less than at the second time, for a cumulative zero drift of about 1%. The method may monitor cumulative zero drift in the flow controller until the cumulative zero drift reaches a critical value, for example, about 10% of the full flow range. At the critical value, the system controller 141 may issue a warning that the flow controller may require servicing and/or replacement. For example, at a cumulative zero drift that exceeds the critical value, for example such as about 20% of the full flow range, the system controller 141 may issue a command to shutdown the flow controller.

Similar to the cumulative zero drift embodiment above, another embodiment of the health monitoring method may include monitoring a cumulative operating lifetime of the flow controller. For example, the method may include monitoring the operating lifetime of the flow controller, for example, each time that the flow controller is in operation and the length of time it remains in operation. A record may be made of the cumulative operating lifetime of the flow controller, for example, from an installation date. For example, a record may be made for a first length of time that the flow controller is operated. The flow controller may be dormant for a period and then operated again for a second length of time. The first length of time and the second length of time may be added together to determine the cumulative operating lifetime of the flow controller. The method may monitor cumulative operating lifetime in the flow controller until the cumulative operating lifetime reaches a critical value, for example, about 8760 hours. At the critical value, the system controller 141 may issue a warning that the flow controller may require servicing and/or replacement. For example, at a cumulative operating lifetime that exceeds the critical value, for example such as about 17520 hour, the system controller 141 may issue a command to shutdown the flow controller.

Another embodiment of the health monitoring method may include monitoring temperature stability in the flow controller. For example, the flow controller may include a temperature sensor (as part of the sensor 120 or a separate sensor) to monitor and adjust position of the adjustable valve 122 in response to temperature variation in the flow controller or in a gas supplied to the flow controller. For example, the temperature variation may be caused by opening a component on the system 100, for example, such as a gas panel or the like. However, there exists no method to monitor the temperature stability in the flow controller. For example, the temperature sensor may cause the flow controller to change the position of the adjustable valve in response to a temperature variation, and product batches may be lost due to lack of indication that a temperature variation existed. Accordingly, the inventive monitoring method may include monitoring the temperature of the flow controller prior to startup, during processing, or at any suitable time to determine temperature stability in the flow controller. For example, the method may include waiting for about 30 seconds or more for the temperature reading to stabilize, for example after startup of the system 100. The temperature value may be sampled at a first interval, for example about every 100 millisecond, over a first period of time, for example about 10 seconds. This sampling process may be performed several times over a second period of time, for example about 10 minutes. The average and standard deviation of the sampled temperature values may be calculated. For example, if the standard deviation exceeds a set temperature value, for example by about 0.1% of the set temperature value, then standard deviation as a percentage of the set temperature value may be displayed with a message that temperature stability has not been achieved on the system controller. Alternatively, if the standard deviation does not exceed the set temperature value, for example if the standard deviation is less than about 0.1% of the set temperature value, then the flow controller may continue functioning normal and no message is displayed.

Another embodiment of the health monitoring method may include monitoring signal noise in the flow controller. For example, signal noise may be monitored for an output signal which may be issued by the position controller to the adjustable valve of the flow controller to change the position of the adjustable valve. For example, over time as the flow controller degrades, the output signal may become noisy. For example, in some embodiments, such as during etching processes, a signal may be used to monitor edge depth and tell the flow controller to stop flowing when the etch depth has been reached. For example, as the output signal becomes more noisy with the degradation of the flow controller, the flow controller may misinterpret the noise in the output signal as an indication that an etch depth has been reached. Accordingly, the inventors have provided a method of monitoring the output signal of the flow controller for signal noise level. For example, the standard deviation from a steady state setpoint of the output signal may be monitored over defined time periods, for example such as about 10 second time periods, at any desirable sample rate, such as about 10 Hertz (Hz), about 100 Hz, about 1000 Hz, or any suitable sample rate. For example, if the standard deviation exceeds the steady state setpoint of the output signal, for example by about 0.1%, a warning may be issued by the system controller 141.

Another embodiment of the health monitoring method may include monitoring the health of the flow controller as a function of several parameters including parameters on the flow controller and parameters in the system 100. For example, parameters may include flow controller flow output, flow controller pressure output, flow controller temperature output, flow controller valve position, total nitrogen equivalent flow output of the flow controller, chamber pressure, exhaust valve position, or the like. For example, one or more combinations of the parameters may be used to diagnose one or more system behaviors, such as if the flow controller is flowing high or low, if the line pressure is increasing or decreasing, if the line temperature is increasing or decreasing, or the like. For example, the line pressure and line temperature as discussed above may refer to the pressure and temperature in a gas supply line disposed between the gas source 118A,B and the flow controller 110A,B.

For example, at the startup of the system 100, for example when it is first brought on line or after the system 100 has been shut down to service, a series of diagnostic measurements can be recorded. For example, the flow controller may provide a first flow rate and the parameters discussed above may be recorded at the first flow rate. For example, after a process run, or periodically, or at random monitoring intervals, the chamber may be tested to see if the flow controller continues to provide the first flow rate at the same values of the parameters as initially recorded. For example, a combination of parameters may be used to diagnose a system behavior. For example, if at the first flow rate, the flow controller valve position, the total nitrogen equivalent flow, and the exhaust valve position are now higher than initially measured, then the flow controller may be flowing high. However, if only one parameter is off, for example on the flow controller valve position is higher, but the total nitrogen equivalent flow and the exhaust valve position are the same, then that may be indicative of a problem other than the flow controller flowing high. For example, if at the first flow rate, the flow controller valve position, the total nitrogen equivalent flow, and the exhaust valve position are now lower than initially measured, then the flow controller may be flowing low. Accordingly, other combinations of parameters can be used to diagnose other system behaviors, such as those listed above.

Alternative to, or in combination with the health monitoring of the flow controller as discussed in the preceding paragraphs, the monitored parameters of the flow controller and/or the parameters of the process chamber may be utilized, for example, to optimize response time during subsequent process steps and/or for other predictive diagnostic methods. For example, a parameter of the flow controller, such as a valve voltage or the like, may be monitored as discussed above in combination with other parameters, such as those of the flow controller and/or the process chamber. The parameter of the flow controller may produce a desired response, such as a desired flow rate or the like. For example, in a subsequent process step, the flow controller may be set to the monitored parameter and optionally, in combination with other monitored parameters of the process chamber and/or flow controller to optimize the time to produce the desired response. Alternatively, in a subsequent process step, the flow controller may be set to a new value for the monitored parameter, for example, such as a new value that is extrapolated based on the monitored parameter to optimize the time to produce a desired response.

Other examples, such as predictive diagnostic methods, may include monitoring an inlet pressure, such as an inlet pressure to the flow controller. For example, if the monitored inlet pressure changes over time, or between process steps, or the like, a warning may issued or a pressure transducer diagnostic routine may be activated.

While the foregoing is directed to embodiments of the present invention, other and further embodiments of the invention may be devised without departing from the basic scope thereof.

The invention claimed is:

1. A method of in-situ calibration of a flow controller coupled to a process chamber, comprising:
providing a flow controller that is configured to provide a first gas at a first value of a flow rate when set to a first value of a setpoint based on a calculated first relationship determined by using a standard gas that is different from the first gas;
determining an actual first relationship between the flow rate and the setpoint for the first gas from a plurality of different values of the flow rate of the first gas determined at a corresponding plurality of different values of the setpoint of the flow controller, wherein each of the plurality of values of the flow rate is determined from flowing the first gas through the flow controller at corresponding ones of the plurality of values for the setpoint; and
flowing the first gas at the first value of the flow rate from the flow controller into the process chamber, based on the actual first relationship.

2. The method of claim 1, wherein the plurality of values for the flow rate of the first gas is determined by a calibration device coupled to the process chamber.

3. The method of claim 2, wherein determining the plurality of values for the flow rate of the first gas using the calibration device further comprises:
measuring a rate of pressure rise for the first gas at each corresponding value of the plurality of values of the setpoint; and
determining each value of the plurality of values of the flow rate for the first gas from the rate of pressure rise at each corresponding value of the plurality of values of the setpoint.

4. The method of claim 1, wherein determining the calculated first relationship further comprises:
determining an actual second relationship between a flow rate and a setpoint for the standard gas from a plurality of values for the flow rate of the standard gas and a corresponding plurality of values of the setpoint of the flow controller; and
applying a gas correction factor to adjust the actual second relationship for use with the first gas to form the calculated first relationship.

5. The method of claim 4, wherein flowing the first gas at the first value of the flow rate from the flow controller based on the actual first relationship further comprises:
determining a second value of the setpoint different from the first value of the setpoint that produces the first value of the flow rate for the first gas based on the actual first relationship; and
applying the second value of the setpoint as an input value to calculated first relationship to provide an output value equal to the first value of the flow rate for the first gas from the flow controller.

6. The method of claim 4, wherein flowing the first gas at the first value of the flow rate from the flow controller based on the actual first relationship further comprises:
replacing the calculated first relationship with the actual first relationship on the flow controller; and
setting the flow controller to the first value of the setpoint based on the actual first relationship to flow the first gas at the first value of the flow rate from the flow controller.

7. An apparatus for processing a substrate, comprising:
a process chamber having a processing volume;
a first flow controller coupled to the process chamber to provide a first gas to the processing volume, wherein the first flow controller is configured to provide the first gas at a first value of a flow rate when set to a first value of a setpoint based on a calculated first relationship determined by using a standard gas that is different from the first gas; and
a controller coupled to the process chamber and comprising a non-transitory computer readable medium having instructions stored thereon that, when executed by the controller, cause a first method for flowing a gas into the processing volume to be performed, the method comprising:
determining an actual first relationship between the flow rate and the setpoint for the first gas from a plurality of different values of the flow rate of the first gas determined at a corresponding plurality of different values of the setpoint of the first flow controller, wherein each of the plurality of values of the flow rate is determined from flowing the first gas through the first flow controller at corresponding ones of the plurality of values for the setpoint; and
flowing the first gas at the first value of the flow rate from the first flow controller into the process chamber, based on the actual first relationship.

8. The apparatus of claim 7, further comprising:
a calibration device coupled to the apparatus between the first flow controller and the processing volume to determine the plurality of values for the flow rate of the first gas.

9. The apparatus of claim 8, wherein determining the plurality of values for the flow rate of the first gas using the calibration device in the first method further comprises:
   measuring a rate of pressure rise for the first gas in the calibration device at each corresponding value of the plurality of values of the setpoint; and
   determining each value of the plurality of values of the flow rate for the first gas from the rate of pressure rise at each corresponding value of the plurality of values of the setpoint.

10. The apparatus of claim 7, wherein the first flow controller includes a first position controller having a computer readable medium having instructions stored thereon that, when executed by the first position controller, cause the first position controller to perform a second method for flowing a gas into the processing volume, comprising:
   applying the calculated first relationship to an input value of the setpoint to flow the first gas at a corresponding output value of the flow rate into the processing volume, wherein the setpoint controls a position of an adjustable valve of the first flow controller.

11. The apparatus of claim 10, wherein the controller is further configured to cause determining the calculated first relationship to further comprise:
   determining an actual standard relationship between a flow rate and a setpoint for the standard gas from a plurality of values for the flow rate of the standard gas and a corresponding plurality of values of the setpoint of the first flow controller; and
   applying a first gas correction factor to adjust the actual standard relationship for use with the first gas to form the calculated first relationship.

12. The apparatus of claim 11, wherein flowing the first gas at the first value of the flow rate from the first flow controller based on the actual first relationship in the first method further comprises:
   determining a second value of the setpoint different from the first value of the setpoint that produces the first value of the flow rate for the first gas based on the actual first relationship; and
   applying the second value of the setpoint as the input value to calculated first relationship to produce the output value equal to the first value of the flow rate for the first gas from the first flow controller.

13. The apparatus of claim 11, wherein flowing the first gas at the first value of the flow rate from the first flow controller based on the actual first relationship in the first method further comprises:
   replacing the calculated first relationship with the actual first relationship on the first flow controller; and
   setting the first flow controller to the first value of the setpoint based on the actual first relationship to flow the first gas at the first value of the flow rate from the first flow controller.

14. The apparatus of claim 7, further comprising:
   a second flow controller coupled to the process chamber to provide a second gas to the processing volume, wherein the second flow controller is configured to provide the second gas at a second value of a flow rate when set to a second value of a setpoint based on a calculated second relationship determined by using a standard gas that is different from the second gas.

15. The apparatus of claim 14, wherein the first method for flowing a gas into the processing volume stored on the computer readable medium of the controller further comprises:
   determining an actual second relationship between the flow rate and the setpoint for the second gas from a plurality of values of the flow rate of the second gas determined at a corresponding plurality of values of the setpoint of the second flow controller, wherein each of the plurality of values of the flow rate is determined from flowing the second gas through the second flow controller at corresponding ones of the plurality of values for the setpoint; and
   flowing the second gas at the second value of the flow rate from the second flow controller based on the actual second relationship.

16. The apparatus of claim 15, wherein the second flow controller includes a second position controller having a computer readable medium having instructions stored thereon that, when executed by the second position controller, cause the second position controller to perform a second method for flowing a gas into the processing volume, comprising:
   applying the calculated second relationship to an input value of the setpoint to flow the second gas at a corresponding output value of the flow rate into the processing volume.

17. The apparatus of claim 16, wherein determining the calculated second relationship in the first method further comprises:
   determining an actual standard relationship between a flow rate and a setpoint for the standard gas from a plurality of values for the flow rate of the standard gas and a corresponding plurality of values of the setpoint of the second flow controller; and
   applying a second gas correction factor to adjust the actual standard relationship for use with the second gas to form the calculated second relationship.

18. The apparatus of claim 17, wherein flowing the second gas at the second value of the flow rate from the second flow controller based on the actual second relationship in the first method further comprises:
   determining a third value of the setpoint different from the second value of the setpoint that produces the second value of the flow rate for the second gas based on the actual second relationship; and
   applying the third value of the setpoint as the input value to calculated second relationship to provide the output value equal to the second value of the flow rate for the second gas from the second flow controller.

19. The apparatus of claim 17, wherein flowing the second gas at the second value of the flow rate from the second flow controller based on the actual second relationship in the first method further comprises:
   replacing the calculated second relationship with the actual second relationship on the second flow controller; and
   setting the second flow controller to the second value of the setpoint based on the actual second relationship to flow the second gas at the second value of the flow rate from the second flow controller.

20. The apparatus of claim 14, wherein a calibration device is coupled to the apparatus between the second flow controller and the processing volume, wherein the calibration device is used to determining the plurality of values for the flow rate of the second gas.

* * * * *